(12) United States Patent
Fasce et al.

(10) Patent No.: US 8,182,962 B2
(45) Date of Patent: May 22, 2012

(54) FUEL CELL SEPARATOR PLATE

(75) Inventors: Sergio Fasce, Rapallo (IT); Lorenzo Tosonotti, Novi Ligure (IT); Maurizio Zappaterra, Genoa (IT)

(73) Assignee: Ansaldo Fuels S.p.A., Genoa (IT)

( * ) Notice: Subject to any disclaimer, the term of this patent is extended or adjusted under 35 U.S.C. 154(b) by 1112 days.

(21) Appl. No.: 11/912,208

(22) PCT Filed: Apr. 21, 2005

(86) PCT No.: PCT/IT2005/000233
§ 371 (c)(1),
(2), (4) Date: Jan. 10, 2008

(87) PCT Pub. No.: WO2006/111990
PCT Pub. Date: Oct. 26, 2006

(65) Prior Publication Data
US 2008/0193824 A1    Aug. 14, 2008

(51) Int. Cl.
*H01M 4/64* (2006.01)
(52) U.S. Cl. ........ 429/518; 429/478; 429/514; 429/457; 429/452
(58) Field of Classification Search .................. 429/452, 429/464, 472, 477, 478, 507, 508, 511, 512, 429/513, 514, 12, 34, 35, 38, 39, 457, 469, 429/509, 510, 516, 518.522; 411/522, 523, 411/529; 108/38, 46
See application file for complete search history.

(56) References Cited

U.S. PATENT DOCUMENTS

| | | | |
|---|---|---|---|
| 4,514,475 A | | 4/1985 | Mientek et al. |
| 4,604,331 A | * | 8/1986 | Louis ............................ 429/511 |
| 4,609,595 A | * | 9/1986 | Nickols ......................... 429/464 |
| 5,084,364 A | | 1/1992 | Quaadvliet et al. |
| 5,378,247 A | * | 1/1995 | Sasaki et al. ................. 29/623.1 |
| 2003/0194567 A1 | * | 10/2003 | Lingle et al. .................. 428/426 |
| 2003/0194597 A1 | * | 10/2003 | Ganski et al. .................... 429/38 |

FOREIGN PATENT DOCUMENTS
| | | |
|---|---|---|
| EP | 1339123 | 8/2003 |
| EP | 1445815 | 8/2004 |

* cited by examiner

*Primary Examiner* — Ula C Ruddock
*Assistant Examiner* — Scott J Chmielecki
(74) *Attorney, Agent, or Firm* — Shoemaker and Mattare (57) ABSTRACT

The present invention relates to a fuel cell separator plate comprising at least one separator sheet and at least one flange suitable to be fixed on the side of the separator sheet by means of shape-coupling.
The invention also relates to a fuel cell comprising said separator sheet, preferably a molten carbonate fuel cell (MCFC). The invention also relates to a stack of these fuel cells being electrically coupled to each other.

25 Claims, 9 Drawing Sheets

FUEL CELL SEPARATOR PLATE

FIELD OF THE INVENTION

The present invention relates to a fuel cell separator plate and a fuel cell comprising said separator plate. The invention also relates to a stack of these fuel cells electrically coupled with each other.

BACKGROUND ART

A stack consists of a set of individual fuel cells being serially electrically coupled with each other through planar metal elements that separate them from each other in a sealed manner. These components, which are usually called separator plates or bipolar plates and consist of a rectangular planar metal sheet suitably shaped at the edges thereof, in combination with the electrodes and the matrix, have several functions:
- they separate the anode area from the cathode area in a sealed manner, thereby preventing that the reacting gases may mix with each other;
- they ensure a tight seal of the reacting gases towards the outside, by means of the shaping of the edges and the combination with the electrolyte matrix;
- they contain therein the active components and the repetitive metal components making up the cell core;
- in combination with the current collectors, they ensure that the reacting gases are properly distributed on the cell plane;
- they ensure good conduction of the electrons produced by the reactions occurring within the cells.

The stacks of molten carbonate fuel cells (MCFC) can be classified according to the type of treatment for the fuel gas and the typology of cell feed.

In the first case, the stacks can be characterized by an "internal reforming" or "external reforming".

The "reforming" is the process through which an organic gas (such as $CH_4$) is almost entirely turn into hydrogen ($H_2$); in the case of "internal reforming", this process takes place within the stack, and more precisely in the separator plates, whereas in the case of "external reforming" the organic gas entering the cell has already been transformed.

An example of stack with "internal reforming" can be found in U.S. Pat. No. 5,084,364.

Another distinctive element among the MCFC stacks is the type of feed of the fuel gas (generally $H_2$ or $CH_4$) and oxidant (generally air or $O_2$) to the cell, which can be carried out by means of "internal or external manifolding".

The separator plates for MCFC stacks with "external manifolding" are currently made from a planar metal sheet that is generally large as the cell active area, and by providing edges on the four sides of the sheet, which are folded in opposite directions. These edges take the shape of open flanges directed towards the inside of the sheet, with the same folding direction on the opposite sides thereof, but oriented in the opposite direction along the adjacent sides. Generally, these flanges are obtained from the same sheet making up the separator plate. An example of these separator plates can be found in U.S. Pat. No. 4,514,475.

Alternatively, the flange is made independently from the separator sheet, by simply using a smaller metal sheet being folded on itself such as to obtain a planar area required for attachment to the plate. An example of this type of flange can be found in U.S. Pat. No. 4,609,595.

In both cases, the flanges have to be suitably stiffened therein such as to resist the axial load to which they are subjected for the whole length thereof.

This stiffening is usually carried out by inserting suitable metal component within the flange, which are designed to ensure load resistance. This kind of components can be similar to strips of materials provided with a certain rigidity, which behave like springs.

The flanges have the double task of providing a tight seal for the gases towards the outside by using the sealing action of the matrix positioned thereon, as well as of defining the inner area of the separator plate in which the current collectors are positioned, thereby ensuring that the reacting gas properly passes therethrough.

Finally, due to the contact with the matrix along the outer areas, these flanges, whether they are directly obtained from the separator sheet or from a separated plane metal sheet, require a coating protecting them from the corrosion effects caused by the electrolyte.

The disadvantage of using flanges obtained from the same sheet making up the separator sheet is that a bulky component has to be manipulated while providing said protective coating, even when the areas covered by the flanges are minimal. This results in higher costs of the manufacturing process, greater hazard of possible manipulation injuries, and more difficult handling. Another disadvantage relates to the use of the same material both for the electrically active, planar part of the separator plate, and for the flanges. There results the need for selecting a conductive material and providing suitable protective coatings therefor, in order to give the same a good corrosion resistance in the flanges; this implies an increase in the manufacturing costs.

The prior art flanges provided independently from the separator plate suffer from the disadvantage of being anchored to the separator plate only by the friction between both contact surfaces; this causes relative movements occurring between the components during all the handling and assembly steps. Thereby, the precision required for stacking the cells is not ensured, which can therefore present themselves with different profiles and consequently with problems related with the planarity of the stack faces. Furthermore, strips of material are placed throughout the length of the prior art flanges in order to provide the required mechanical strength and rigidity. This operation is problematic during the assembly step, mainly with flanges having a closed profile and very long (>600 mm).

SUMMARY OF THE INVENTION

The present invention allows to overcome the above listed problems of the prior art, by providing a fuel cell separator plate such as defined in the annexed claims.

The invention also provides a fuel cell comprising said separator plate and a stack of said fuel cells electrically coupled with each other, both being as described in the annexed claims.

Preferably, said fuel cell is a molten carbonate fuel cell (MCFC). More preferably, it is a MCFC cell with "external manifolding".

BRIEF DESCRIPTION OF THE DRAWINGS

Further characteristics and further advantages of the invention will become apparent from the description of preferred embodiments thereof, which are merely illustrative and non-limiting, with reference to the annexed figures, in which.

DETAILED DESCRIPTION OF THE INVENTION

With reference to the annexed Figures, the separator plate according to the invention is overall designated with numeral 1 and the current collectors with numeral 2.

The separator plate 1 comprises a separator sheet 3, a plurality of flanges 4 and a plurality of corner plugs 5.

Figure 3:
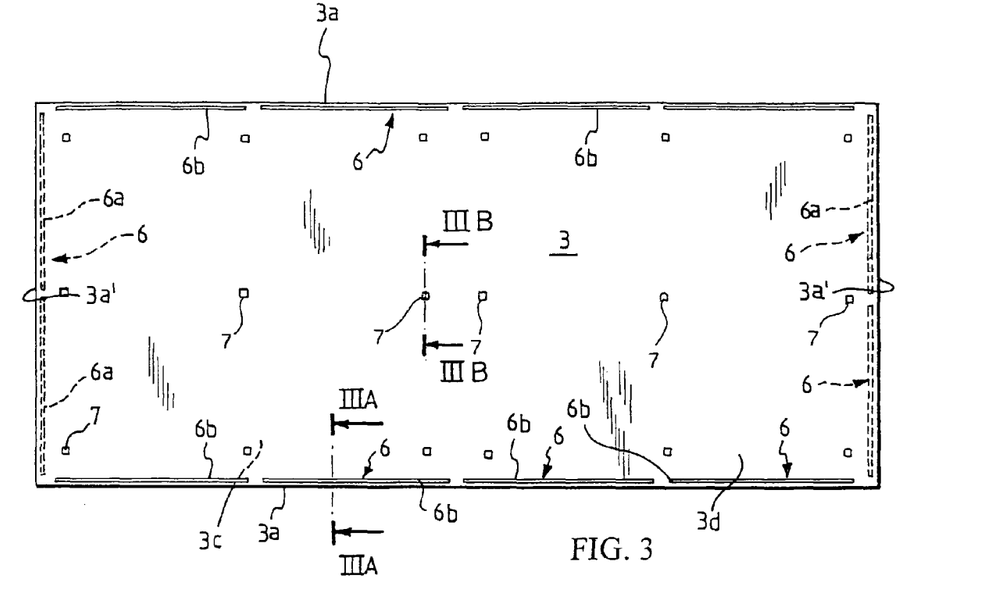
FIG. 3 shows a top view of the separator sheet according to the invention.

In the example, the separator sheet 3 has a rectangular shape and two long sides $3a$, two short sides $3a'$, four angles $3b$, an upper surface $3c$ and a lower surface $3d$. Parallel to said two long sides $3a$ and two short sides $3a'$, and in proximity thereof, there extends a plurality of mouldings, which are overall designated with 6.

In the example, on the upper surface $3c$ there is provided a total amount of four mouldings $6a$ (in the following called the cathode mouldings), extending in groups of two parallel to and in proximity of each of the two short sides $3a'$. On the lower surface $3d$ there is provided a total amount of eight mouldings $6b$ (in the following called anode mouldings) extending in groups of four parallel to and in proximity of each of the two long sides $3a$. In other words, the mouldings on the long sides extend on the opposite side of the separator sheet 3 relative to the mouldings of the short sides.

Figure 3A:
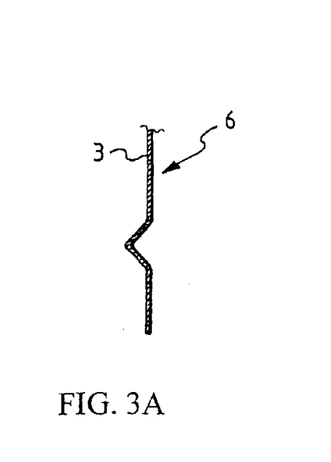
FIG. 3A shows a sectional view of a portion of the separator sheet from FIG. 3, according to line IIIA-IIIA from FIG. 3.

The mouldings 6 preferably have a triangular section, such as illustrated in FIG. 3A.

Figure 3B:
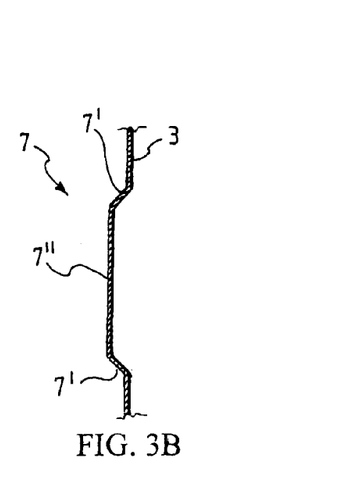
FIG. 3B shows a sectional view of a detail of the separator sheet from FIG. 3, according to line IIIB-IIIB from FIG. 3.

In accordance with a possible embodiment, the separator sheet 3 further comprises a plurality of indentations 7. The indentations 7 advantageously extend from the lower surface $3d$ on the same side of the anode mouldings in the present embodiment where the anode current collector is placed downwards and thus it requires to be anchored to the separator sheet 3. If the cathode current collector $2b$ were placed downwards and the anode current collector $2a$ were placed upwards, upon assembling the stack, said indentations 7 would advantageously extend from the lower surface $3d$ of the separator sheet 3, on the same side of the cathode mouldings $6a$. In the example illustrated above, there are eighteen of said indentations 7 and they are provided on the lower surface $3d$ of the separator sheet 3, collected in groups arranged along lines parallel to the short sides or long sides of the separator sheet. In the example illustrated above, the indentations 7 are arranged in groups of three parallel to the short sides $3a'$ (or in groups of six parallel to the long sides $3a$). In accordance with a possible embodiment, the indentations 7 have two inclined sides 7' ending in a plane portion 7" parallel to the surface $3d$ of the separator sheet 3, such as shown in FIG. 3B. Said indentations 7 can alternatively have different shapes, for example they can be circular, elliptic, square or rectangular. The indentations 7 are used to couple the current collector 2 with the separator sheet 3 and hold the same in position, such as described below.

The separator sheet is for example manufactured from stainless steel.

The separator plate 1 also comprises a plurality of flanges 4, particularly two anode flanges $4a$ and two cathode flanges $4b$. A flange 4 consists of a single metal sheet, preferably stainless steel, folded twice.

Figure 4:
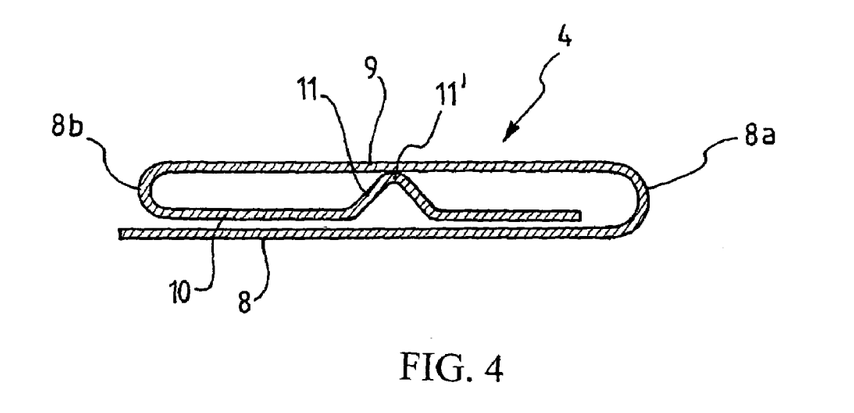
FIG. 4 shows a sectional view of a flange according to the invention.
Figure 6:
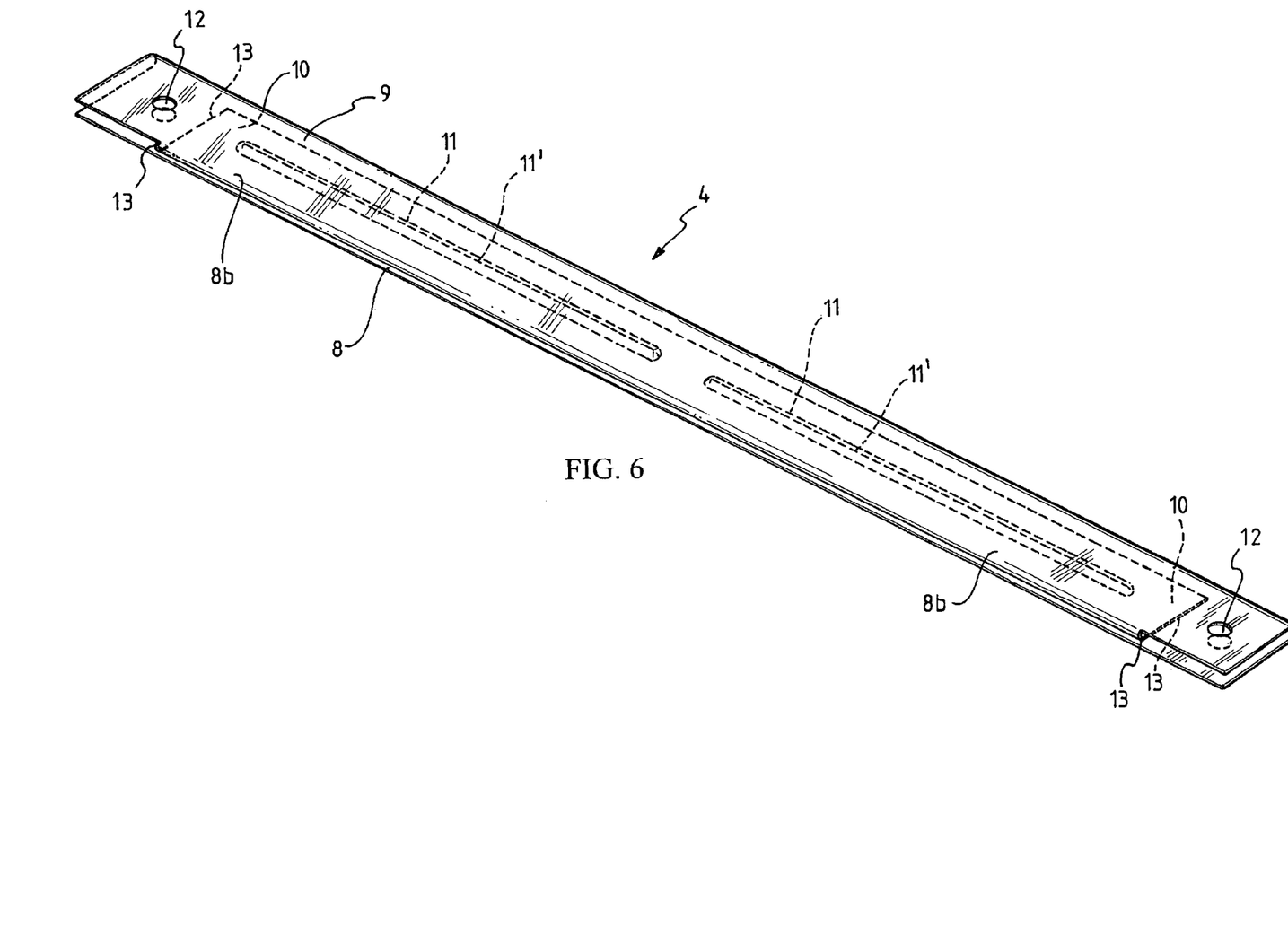
FIG. 6 is a perspective view of a cathode flange according to the invention.

Particularly, said flanges 4 have a lower planar portion 8 which is joined, through a preferably semicircular edge $8a$, to a upper planar portion 9, which, in turn, is joined, through a preferably semicircular edge $8b$, and having a lower height than edge $8a$, to an inner portion 10, which is placed parallel to and internally of the lower planar portion 8 and interrupted at about half the width thereof by at least one indentation 11, preferably a plurality of indentations 11. Advantageously, the indentations have a triangular section, the vertex 11' thereof touching the inside of the upper planar surface 9 (FIG. 4). In accordance with a possible embodiment, each indentation 11 extends parallel to the respective flange 4 (FIG. 6).

Figure 5:
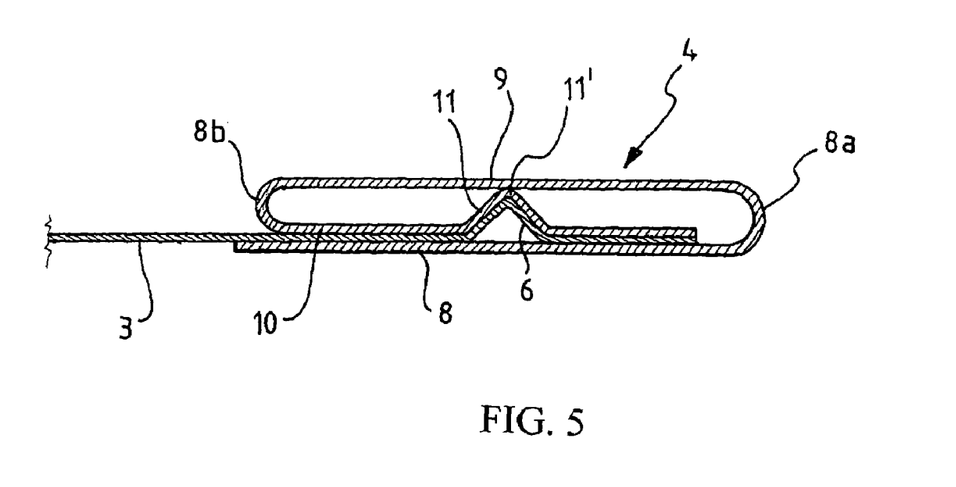
FIG. 5 is a sectional view of a flange and the separator sheet when assembled.

The plane lower portion 8 and the inner portion 10, interrupted by the indentations 11, form a gap suitable to house a peripheral tract of the separator sheet 3 (FIG. 5). The upper portion 9 and the inner portion 10, particularly at the edge $8b$, define a strike and containment element for a current collector. As a consequence, two flanges arranged on opposite sides of the separator sheet define a housing area for the current collector.

The coupling of the flanges 4 to the separator sheet 3 takes place by means of the shape-coupling between the indentations 11 and the mouldings 6. In fact, in accordance with the present invention, both the shape and position of the indentations 11 match the mouldings 6.

In the example, each anode flange $4a$ comprises four indentations 11 housing, when the plate is assembled, four anode mouldings $6b$ and each cathode flange $4b$ comprises two indentations 11 housing, when the plate is assembled, two cathode mouldings $6a$. In various exemplary embodiments, the number and shape of the indentations and mouldings may be other than that described or illustrated above.

In the assembly step, accordingly, the anode flanges $4a$ are coupled with the separator sheet 3 such that the upper portion 9 is parallel to the lower surface $3d$ of the separator sheet 3 and the lower portion 8 is parallel to the upper surface $3c$. Vice versa, the cathode flanges $4b$ are coupled such that the upper portion 9 is parallel to the upper surface 3c of the separator sheet 3 and the lower portion 8 is parallel to the lower surface 3d.

The assembly is carried out by introducing the edge of the separator sheet in the gap between the lower planar portion 8 and the inner portion 10, until the mouldings of the separator sheet are inserted within the indentations of the flange. In other words, the separator sheet and the respective flanges are advantageously provided such that a mutual shape-coupling is generated along the edges of the separator sheet. This shape coupling preferably develops along a substantial portion of the length of the respective side of the separator side and the flange, thereby generating a constraint against the removal of the flange from the separator sheet. Particularly, said shape-coupling is advantageously provided by means of deformations of the plane surface of the separator sheet and the respective flanges, such as by means of mouldings 6 and indentations 11 such as described above.

Figure 12:
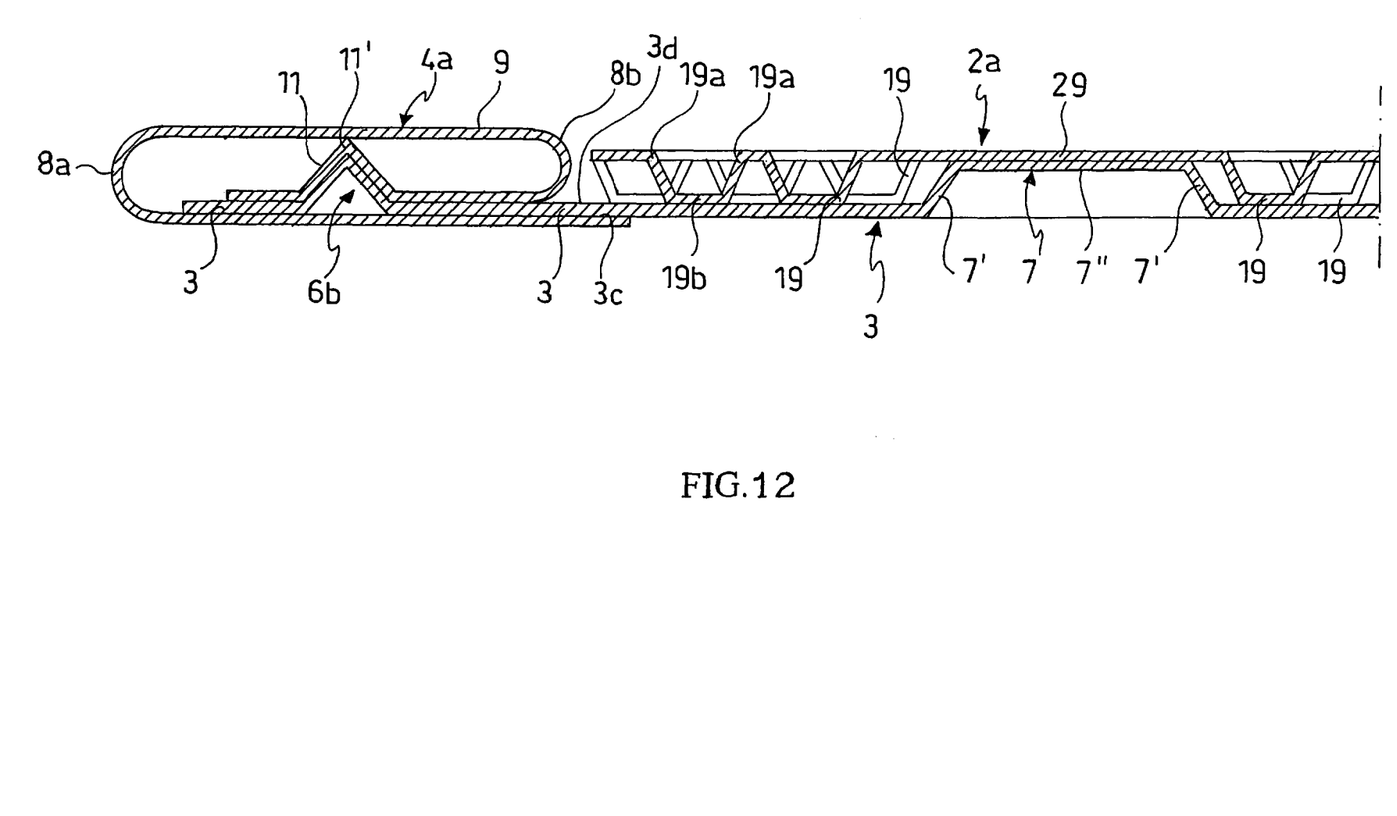
FIG. 12 shows a sectional view of a detail of a separator sheet, a flange and a collector when assembled.

In other words, the anode flanges are inserted in the mouldings on the long sides of the separator sheet, whereby the inner portion 10 and the upper portion 9 are arranged on the side of the lower surface 3d of the separator sheet 3. Similarly, the cathode flanges are inserted on the mouldings of the short sides of the separator sheet, whereby the inner portion 10 and the upper portion 9 are arranged on the side of the upper surface 3c of the separator sheet 3. In FIG. 12 there is illustrated a detail of the separator sheet, an anode current collector and an anode flange being assembled as described above. This figure is also turned upside down relative to the actual arrangement of the assembled stack, in order to show the details of the coupling between the separator plate and the lower (in this case, anode) current collector.

Thereby, the separator plate of the invention is easier to manipulate while assembling the stack, since the separator sheet and the flanges are free from any relative movement. At the same time, the shape-coupling between the mouldings 6 and the indentations 11 ensures suitable rigidity and mechanical compression strength.

At both ends, the flanges 4 are provided with holes 12 made in the upper 9 and lower 8 portions, which are concentric and can be used as the coupling system for the anti-corrosion protective treatment to which the flanges are to be subjected because they are in contact with carbonates upon operation.

Furthermore, at both ends, the flanges 4 have recesses 13 in the inner portion 10 and edge 8b, which are suitably sized to enable the coupling of two orthogonal flanges without interference; the corner plugs 5 are housed in the recesses thus provided, their task being to supply suitable mechanical strength in the angles and inhibit the passage of the reacting gases within the flanges. In other words, the inner portion 10 of the flanges has a smaller length than the upper 9 and lower 8 portions and is arranged in the middle, thereby leaving the flange end portions free.

In accordance with a possible embodiment, the corner plugs 5 consist of a single metal sheet, preferably of Fe—Cr alloy, folded twice. Particularly, these plugs 5 have an upper planar surface 15, which is joined, through an edge 15 for example semicircular-shaped, to a lower planar surface 16 which is shorter than the upper portion, for example having a length equal to about two thirds of the upper portion 15.

Figures 7, 8:
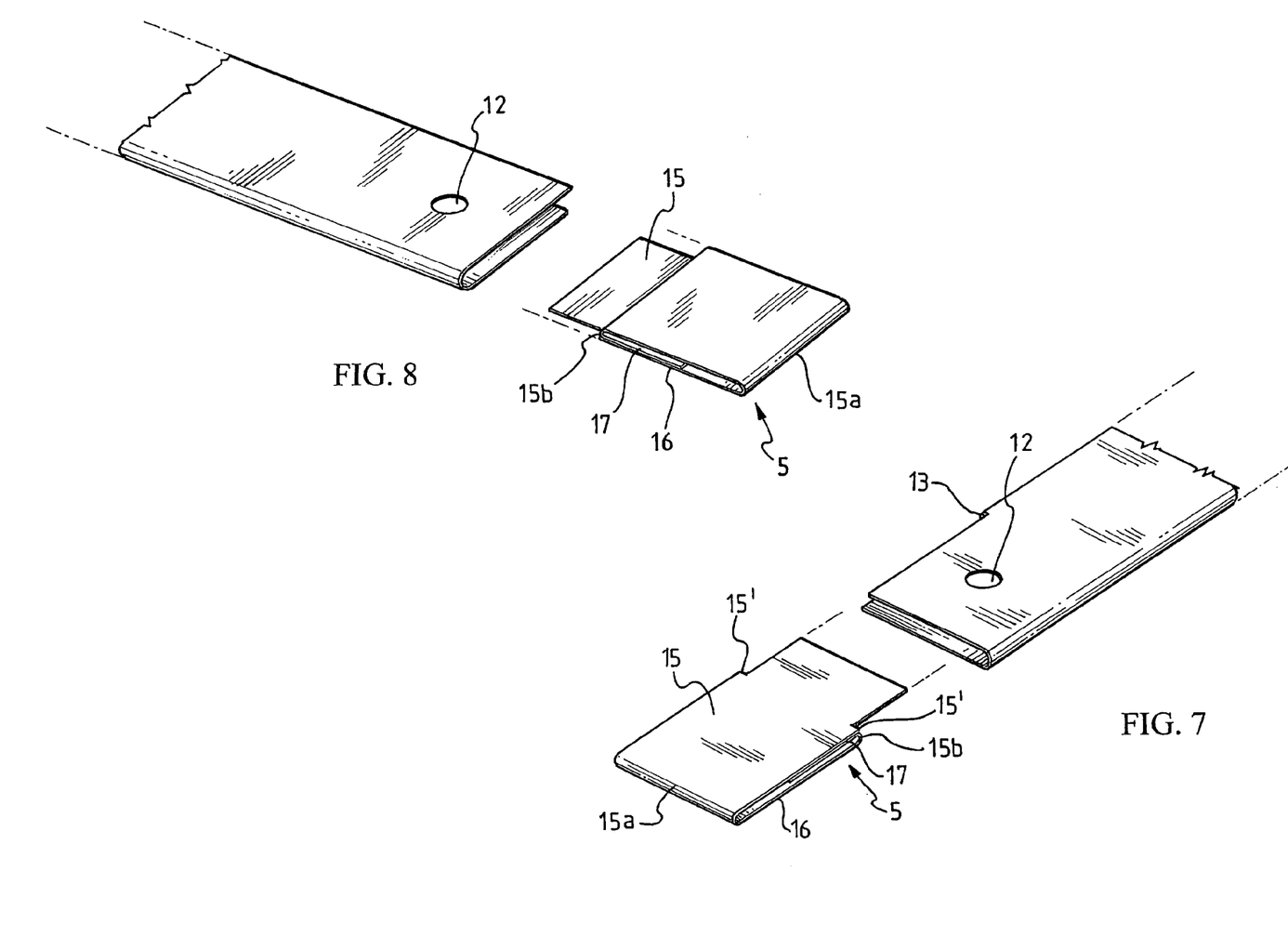
FIG. 7 is a perspective cut-away view of a flange and a plug according to the invention.
FIG. 8 is a perspective, cut-away view of a flange and a plug according to a further embodiment of the invention.
Figure 9:
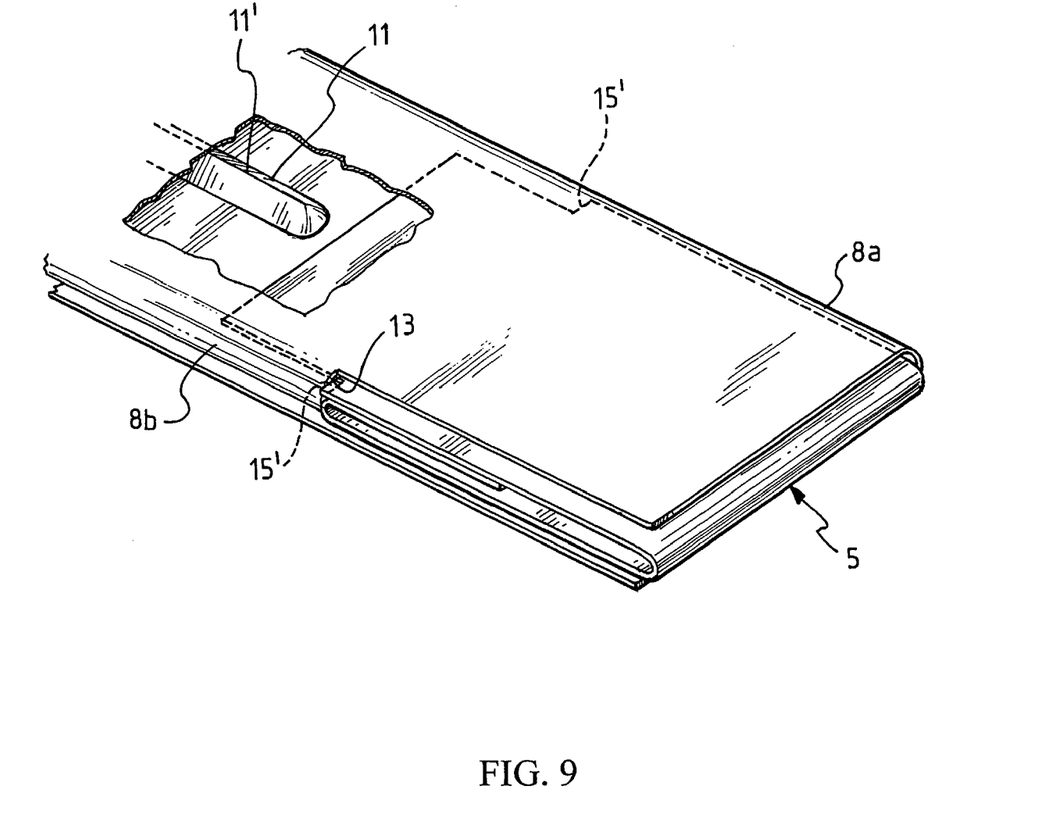
FIG. 9 is a perspective view of the flange and plug from FIG. 7 in the assembled position.

Said lower portion 16 is, in turn, joined, through an edge 15b, for example semicircular, and having a lower height than the edge 15a, to an inner portion 17 of a length almost equal to half the length of the lower portion 16. Said upper portion 15 having at least one recess 15' at the same position of the edge 15b. Preferably, the upper portion 15 has two recesses provided on opposite sides to form an end portion having a lower extension than the upper portion 15 (FIG. 7).

Upon assembly of the separator plate, the corner plugs 5 are introduced at both ends of the flanges 4 in the housing created by the recesses 13 of the inner portion 10 and edge 8b, such that the recess 13 of the flange 4 matches with and abuts against said at least one recess 15' of the plug 5.

Since the upper portion 15 of the corner plug 5 is symmetrical, this plug can be introduced within the flange 4, both with the upper portion 15 facing upwards to touch the inside of the upper portion 9 of flange 4, and vice versa, with the lower portion 16 facing upwards to touch the inside of the upper portion 9 of flange 4.

When the plug 5 has been inserted in the flange 4, the upper portion 15 extends to the contact between the recess 15' and the recess 13 of the flange.

Said corner plugs 5 are eight in total, two for each flange 4 and their main function is to prevent the gases from passing within the flanges, otherwise these gases would not participate in the cell reactions. Other important functions of the corner plugs of the invention are as follows:

providing the angles of the separator plate 1 with the required rigidity and mechanical compression strength;
ensuring a certain profile continuity to the stack cell angles, thereby making the zirconia sealings facing the manifolds more effective.

The step of assembling the stack according to the invention generally provides that the components are stacked following the order below:
Matrix;
Anode
Anode current collector
Separator plate
Cathode current collector
Cathode;
Matrix.

This order can be reversed depending on whether the cathode is desired to be placed upwards or downwards. In any case, however, the electrode placed downwards must be locked to the separator plate in a suitable manner.

Figures 1, 2:
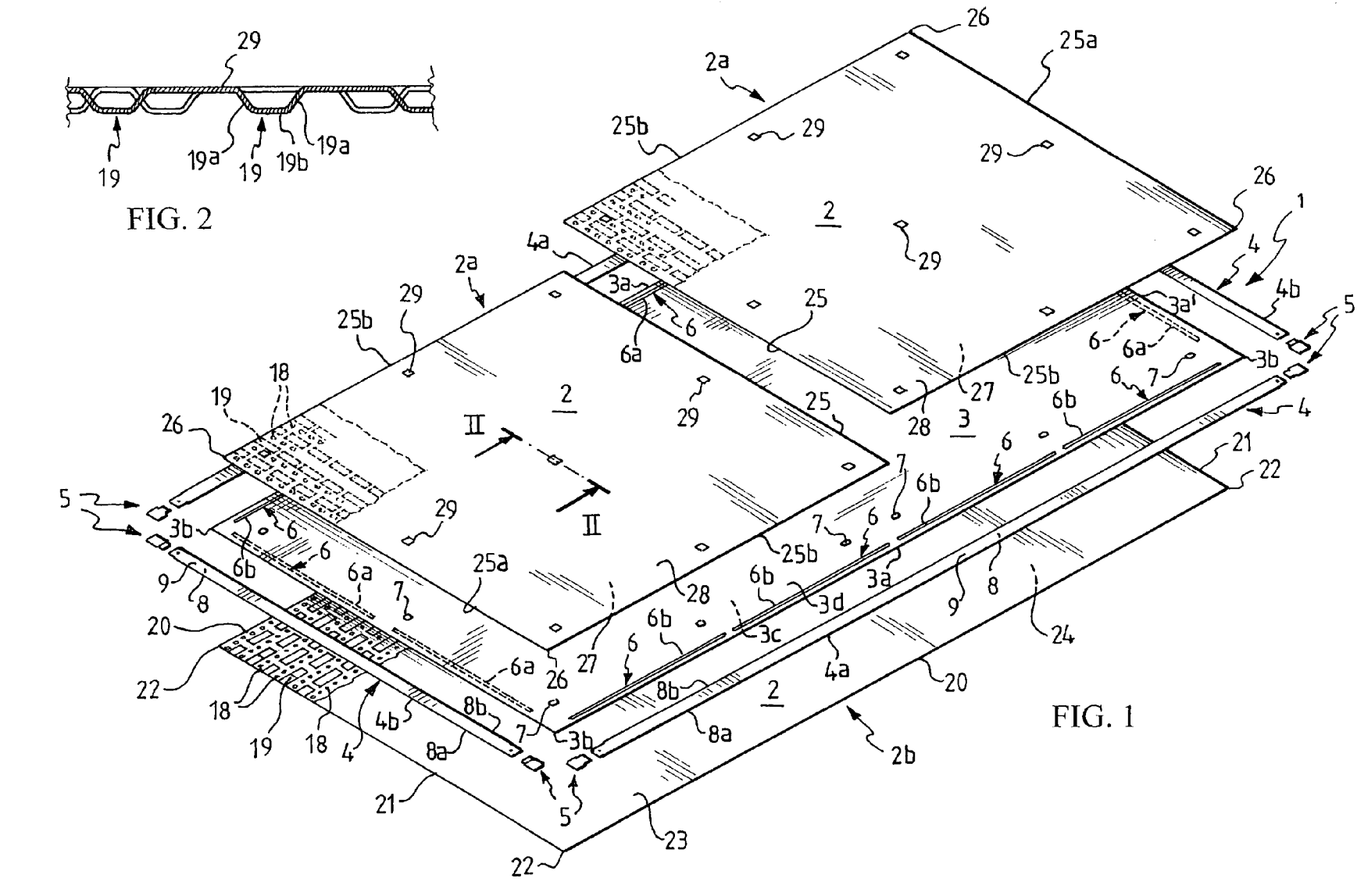
FIG. 1 is an exploded perspective view of the separator plate and particularly the separator sheet, flanges, corner plugs and current collectors (FIG. 1 is turned upside down relative to the actual configuration of the stack in order to show the details of the coupling between the lower current collector and the separator plate)
FIG. 2 shows a sectional view of a portion of an element from FIG. 1, according to line II-II from FIG. 1.

FIG. 1 shows a particular embodiment of the invention in which the anode current collector 2a is placed downwards, during the assembly step, and suitably fixed to the separator plate 1, whereas the cathode current collector 2b is placed upwards and is rested on the separator plate 1 (FIG. 1 is turned upside down relative to the actual configuration of the stack, in order to show the details of the coupling between the anode current collector and the separator plate). The matrix, cathode and anode are not shown, for clarity reasons. In any case, any type of matrix and electrode known in the art can be used for the purpose of this invention.

With reference to FIGS. 1, 8, 9 and 10, the anode and cathode current collectors are designated with 2a and 2b, respectively.

Said collectors 2a and 2b are metal sheets, for example made from stainless steel, with nickel being laminated thereon, and moulded using the techniques known in the art.

Alternate rows of holes 18 and arches 19, preferably having the same size both in the anode 2a and cathode 2b collectors, are provided by moulding.

Figure 10:
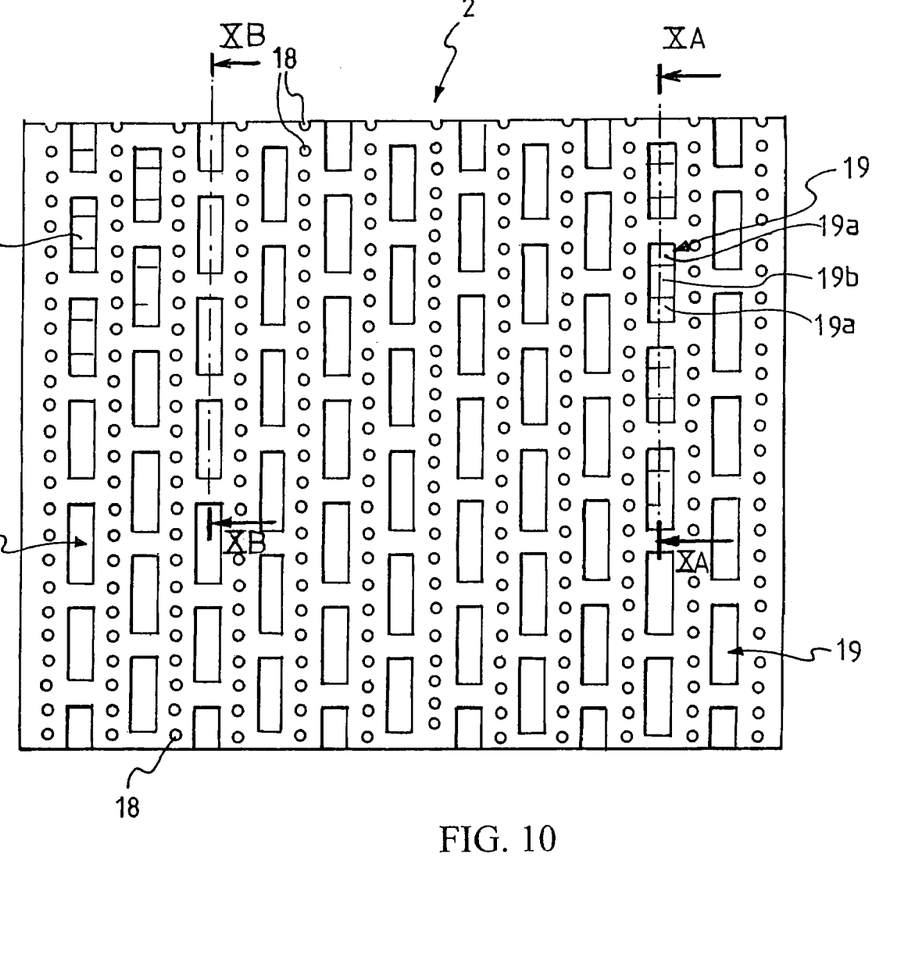
FIG. 10 is a top view of a current collector according to the invention, such as a cathode collector.
Figures 10A, 10B:
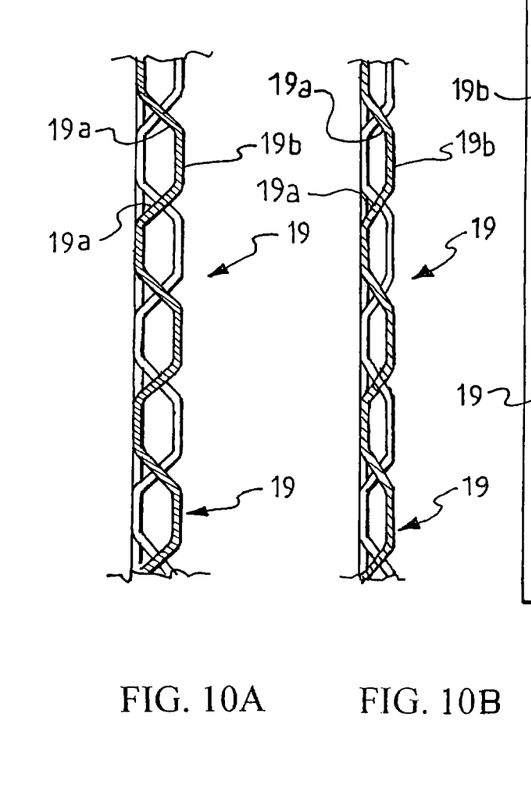
FIG. 10A is a sectional view according to the line XA-XA from FIG. 10.
FIG. 10B is a sectional view according to the line XB-XB from FIG. 10.

Said arches 19 are moulded at evenly spaced intervals in each row and in offset positions relative to the arches belonging to the subsequent row (FIG. 10). They are preferably trapezoid-shaped, i.e. they have two inclined sides 19a, joined in an uninterrupted manner by a planar portion 19b, parallel to the unmoulded current collector surface. The stack components are assembled such that the planar portions 19b of the arches 19 of the collectors face the separator plate 1, whereas the respective electrodes (not shown) are rested on the opposite surface of the current collectors. The arches 19 ensure that between the separator plate 1 and the electrode there is room for the fuel and oxidant gas to pass therethrough.

Figure 11:
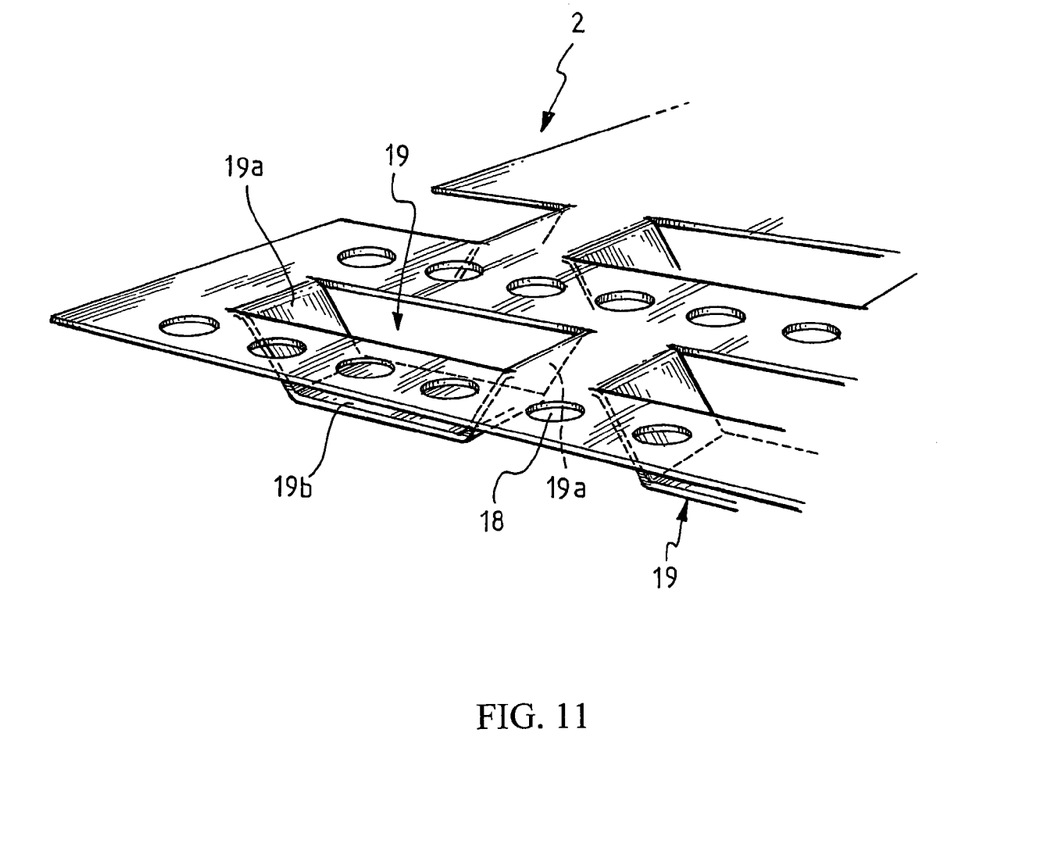
FIG. 11 shows a perspective view of a detail of a current collector.

Said holes 18 are moulded at evenly spaced intervals in each row and are evenly sized. The holes 18 have the function of increasing the contact surface between the gas and the electrode. Advantageously, the holes 18 are alternated relative to the arches 19 (FIGS. 10 and 11).

In the example, the cathode current collector 2b is rectangular-shaped and has two long sides 20, two short sides 21, four angles 22, a lower surface 23 and an upper surface 24.

The lower surface 23 comprises a plurality of arches 19 arranged in parallel alternate rows, which are moulded such that their longitudinal axis is parallel to the long sides 20 (perpendicular to the arches provided in the anode current collector 2a). Thereby, the longitudinal axis of the arches 19 is orthogonal to the passage of the oxidant gas, when the stack is assembled. The assembly provides that the lower surface 23 is contacted with the part of upper surface 3c of the separator sheet 3 that has been left free from the cathode flanges 4b.

The cathode collector 2b is placed in contact with the upper surface 3c of the separator sheet, also extending to cover the lower portions 8 of the anode flanges 4a. In the other direction, the cathode collector 2b is arranged between the cathode flanges 4b and particularly between the respective edges 8b (FIG. 12).

The part of surface 23 in contact with the lower portion 8 of the anode flanges 4a (i.e. the peripheral portion), has arches 19 of a lower height than the portion in contact with the separator sheet 3 (i.e. the middle portion) in order to compensate the thickness of said lower portion 8 and ensure the planarity of the cell.

The anode current collector 2a comprises two substantially square, almost equally sized metal sheets. Said two metal sheets have each an inner side 25, an outer side 25a, parallel to the inner side 25, two opposite sides 25b, four angles 26, an upper surface 27 and a lower surface 28.

The upper surface 27 comprises a plurality of arches 19 arranged in parallel alternate rows, which are moulded such that their longitudinal axis is parallel to the sides 25 and 25a. Thereby, the longitudinal axis of the arches 19 is orthogonal to the passage of the fuel gas, when the stack is assembled.

The upper surface 27 also comprises a plurality of unmoulded areas 29. Preferably, the number of said unmoulded areas 29 corresponds to the number of the indentations 7 being provided on the lower surface 3d of the separator sheet 3. Particularly, the unmoulded areas 29 are eighteen, nine per each sheet, which are arranged in groups of three parallel to the sides 25 and 25a, in positions corresponding with the indentations 7.

The coupling between the indentations 7 and the unmoulded areas 29 allows the current collector to be firmly fixed to the separator plate 1, which collector is faced downwards during the assembly of the stack, the anode current collector 2a in the example. The assembly is carried out by anchoring the indentations 7 of the separator plate 1 to the unmoulded areas 29 of the anode current collector 2a by means of spot welding or bonding with suitable adhesives.

Accordingly, in the assembled position, the adjacent sides 25 of both sheets of the anode current collector will match each other, thereby also ensuring electric contact, and the upper surface 27 of said two sheets will be in contact with that part of the lower surface 3d of the separator sheet 3 that has been left free from the anode flanges 4a.

The anode collector 2a is placed in contact with the lower surface 3d of the separator sheet, also extending to cover the lower portions 8 of the cathode flanges 4b. In the other direction, the anode collector 2a is arranged between the anode flanges 4a and particularly between the respective edges 8b (FIG. 12).

Preferably, the part of upper surface 27 in contact with the lower portion 8 of the cathode flanges 4b has arches 19 of a lower height than the middle portion in order to compensate the thickness of said lower portion 8 and ensure the planarity of the cell.

Alternatively, the anode collector 2a can consist of a single rectangular-shaped metal sheet having the same area as the sum of the areas of said two metal sheets 2a. Said single metal sheet will have the same characteristics and the same assembly modes as described above for said two metal sheets 2a.

The present invention provides a separator sheet for fuel cells allowing to solve the number of problems of the prior art.

First of all, by adopting a separator plate made of multiple pieces separated from each other, the anticorrosion treatment can be limited only to those parts coming in direct contact with the carbonates, i.e. the flanges, which can be assembled with the other components of the separator plate in a later time. Thereby, after the separator sheet has been formed, it is manipulated only during the assembly step, i.e. the manipulation of the same is minimized, whereby the risk of damages to the sheet during the process is minimized.

Due to the particular system for coupling the flanges to the separator plate, the flanges are properly fixed to the sheet, thereby minimizing the relative movements, and at the same time, it gives the flanges the required rigidity and mechanical compression strength.

Therefore, not only the firm fixing of the flanges to the separator plate is ensured by means of one single system, but also the required indeformability of the flanges. Furthermore, the passage of the reacting gases within the flanges is prevented by inserting two corner plugs at both ends thereof. They also ensure the required mechanical strength in the cell angles and a certain profile continuity for the stack. Therefore, these components perform several functions at the same time. Generally, systems for bonding the current collector, placed downwards, to the separator plate are known in the art, in which the bonding agent is distributed on all the arches of the surface to be bonded. The distribution of the bonding agent is carried out by a roll provided with a glue collection tray. The ratio of actually used adhesive to lost adhesive during the process is quite low. In the current collector, the adhesive is placed only on the unmoulded areas, which will be then bonded to the corresponding indentations of the separator plate. Therefore, the adhesive is 100% used without waste, with a consequent advantage in terms of costs.

It should be understood that variations and/or additions may be provided to what has been described and illustrated above.

For example, a variant embodiment of an corner plug 5 is illustrated in FIG. 8, corresponding to that illustrated in FIG. 7 but rotated by 180°.

Alternatively to what has been described and illustrated above, the indentations 11 and the mouldings 6 can have a different section, suitable to be mutually coupled in order to provide a shape-coupling that gives stability to and stiffens the separator sheet-flange assembly.

The indentations 7 can be provided in number and size other than that described and illustrated above, however, preferably by providing at least one planar tract suitable to provide the contact with the anode collector 2a.

Particularly, the indentations 7 can be used with any type of flange, for example obtained as one piece that is folded with the separator sheet or with flanges anchored by means of friction-coupling or bonding.

To the preferred embodiment of the separator plate such as described above, those skilled in the art, aiming at satisfying contingent and specific requirements, may carry out a number of modifications, adaptations and replacements of elements with functionally equivalent ones, without however departing from the scope of the claims below.

What we claimed is:

1. A fuel cell separator plate comprising
    at least one separator sheet and at least one flange suitable to be fixed on the side of the separator sheet by means of shape-coupling, wherein
    said flange comprises a lower planar portion joined to a upper planar portion which is joined to an inner portion arranged parallel to and internally of said portion and interrupted at about half the width thereof by at least one indentation,
    said lower planar portion is joined to a upper planar portion by means of an edge and said upper planar portion is joined, in turn, to an inner portion by means of an edge, and
    said flange comprises a plurality of indentations.

2. The separator plate according to claim 1, wherein said shape-coupling extends by a portion of the length of the separator sheet side and the flange thereof.

3. The separator plate according to claim 1, wherein said flange defines a gap for receiving an edge portion of the separator sheet, said shape coupling being provided within the gap.

4. The separator plate according to claim 1, wherein said shape coupling is a coupling between at least one molding and at least one indentation, having complementary shapes.

5. The separator plate according to claim 4, wherein said at least one molding and at least one indentation have triangular sections.

6. The separator plate according to claim 4, wherein said separator sheet is provided with a plurality of moldings.

7. The separator plate according to claim 1, wherein said separator sheet comprises eight anode moldings and four cathode moldings, wherein said anode moldings extend in groups of four parallel to and in proximity of each of the long sides of the separator sheet, the separator sheet being rectangular-shaped, and wherein said cathode moldings extend in groups of two parallel to and in proximity of each of the short sides of the separator sheet.

8. The separator plate according to claim 7, wherein said anode moldings are provided on the lower surface of the separator sheet and wherein said cathode moldings are provided on the upper surface of the separator sheet.

9. The separator plate according to claim 1, wherein the vertex of said indentation touches the inside of the upper planar surface of the flange.

10. The separator plate according to claim 1, wherein each indentation extends parallel to the respective flange.

11. The separator plate according to claim 1, comprising two anode flanges and two cathode flanges.

12. The separator plate according to claim 11, wherein said anode flanges, when the plate is assembled, are inserted on the moldings of the long sides of the separator sheet such that the upper portion and the inner portion are arranged on the side of the lower surface of the separator sheet.

13. The separator plate according to claim 11, wherein said anode flanges, when the plate is assembled, are inserted on the moldings of the short sides of the separator sheet such that the upper portion and the inner portion are arranged on the side of the upper surface of the separator sheet.

14. The separator plate according to claim 11, wherein two anode flanges arranged on opposite sides of the separator sheet define a housing area for the anode current collector and wherein two cathode flanges arranged on opposite sides of the separator sheet define a housing area for the cathode current collector.

15. The separator plate according to claim 1 wherein said flange is provided with recesses at both ends in the inner portion and the edge, suitably sized to house a corner plug.

16. The separator plate according to claim 15, wherein said plug comprises an upper planar portion joined through an edge to a lower planar portion that is shorter than the upper portion, which is, in turn, joined through an edge to an inner portion.

17. The separator plate according to claim 16, wherein said upper planar portion has at least one recess flush with the edge.

18. The separator plate according to claim 15, wherein
    said plug is disposed within the flange with the upper portion thereof facing upwards to touch the inside of the upper portion of the flange and with said at least one recess matching the recess of the flange or wherein said plug is introduced within the flange with the lower portion facing upwards to touch the inside of the upper portion of the flange and with said at least one recess matching the recess of flange.

19. The separator plate according to claim 1, wherein said separator sheet comprises a plurality of indentations that are arranged on the surface of the separator sheet.

20. The separator plate according to claim 19, wherein said indentations are coupled to unmolded areas of the current collector by means of bonding or spot welding and wherein the current collector is the anode current collector.

21. The separator sheet according to claim 20, wherein said anode collector comprises a plurality of arches and holes arranged in alternate rows.

22. The separator plate according to claim 21, wherein said anode current collector consists of two metal sheets or is a single metal sheet resting on the upper surface of the separator sheet.

23. A fuel cell comprising a separator plate according to claim 1.

24. The fuel cell according to claim 23 which is a molten carbonate fuel cell (MCFC).

25. A stack of fuel cells according to claim 23.

* * * * *

UNITED STATES PATENT AND TRADEMARK OFFICE
CERTIFICATE OF CORRECTION

PATENT NO.        : 8,182,962 B2  
APPLICATION NO.   : 11/912208  
DATED             : May 22, 2012  
INVENTOR(S)       : Fasce et al.

Page 1 of 1

It is certified that error appears in the above-identified patent and that said Letters Patent is hereby corrected as shown below:

On the cover of the patent in column 1, please correct
(73) Assignee: "Ansaldo Fuels S.p.A., Genoa (IT)"
to:
(73) Assignee: -- Ansaldo Fuel Cells S.p.A., Genova (IT) --

Signed and Sealed this
Fifth Day of March, 2013

Teresa Stanek Rea
*Acting Director of the United States Patent and Trademark Office*